July 12, 1932. T. J. LITLE, JR 1,866,659
METHOD AND MEANS FOR PURIFYING THE REFRIGERANT IN REFRIGERATING SYSTEMS
Filed Aug. 21, 1926
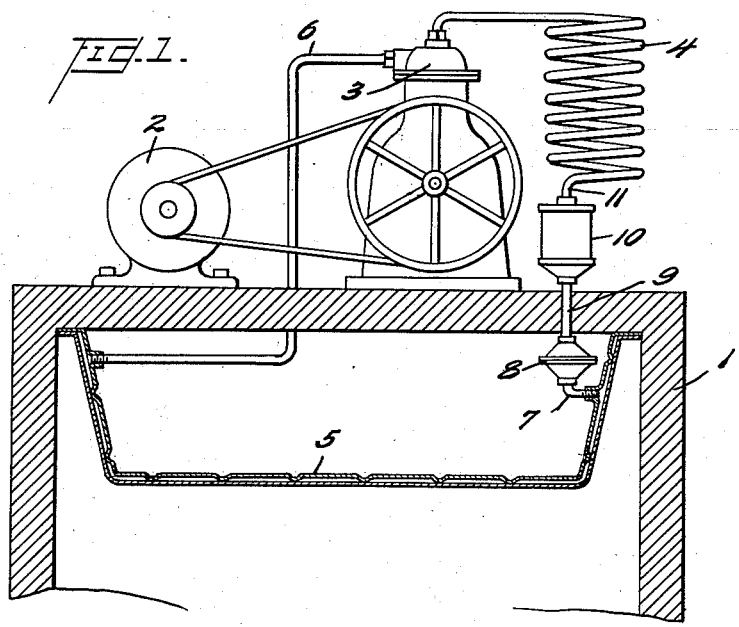
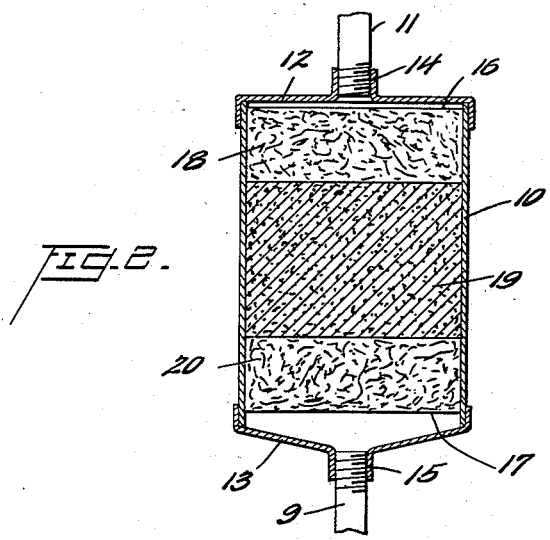
Inventor
Thomas J. Litle, Jr.
By Watson, Coit, Morse & Grindle
Attorneys Patented July 12, 1932

1,866,659

UNITED STATES PATENT OFFICE

THOMAS J. LITLE, JR., OF DETROIT, MICHIGAN, ASSIGNOR, BY MESNE ASSIGNMENTS, TO THE SILICA GEL CORPORATION, OF BALTIMORE, MARYLAND, A CORPORATION OF MARYLAND

METHOD AND MEANS FOR PURIFYING THE REGRIGERANT IN REFRIGERATING SYSTEMS

Application filed August 21, 1926. Serial No. 130,646.

One object of my invention is to provide means for eliminating water contained in volatile refrigerants.

Another object of my invention is to provide means for filtering and for eliminating the water from such volatile refrigerants.

A further object of my invention is to provide a process for filtering and for eliminating water from such volatile refrigerants.

The necessity of dehydrating volatile refrigerants arises from the fact that water or water vapor becoming mixed with hydrocarbons or other volatile refrigerants, such as $SO_2$ sometimes collects and freezes at the low temperature attained by the refrigerant, and thus forms ice within the circulatory system of the refrigerating machine which will completely stop the flow of refrigerant, and at other times such water or water vapor will combine with the sulphur, where the refrigerant $SO_2$ is used, forming sulphurous acid, which attacks the metal parts of the machine and destroys them. The necessity for filtering refrigerant arises from the fact that foreign material in the form of metal particles sometimes gets into the refrigerant and circulates through the system and gets under the seats of the various valves and holds them open, thus causing the system to become inoperative.

With the above and other objects in view, my invention consists in the arrangement, combination and construction of the various parts of my improved device, and the steps of my process, as described in the specification, claimed in my claims and shown in the accompanying drawing, in which:

Fig. 1 is a sectional view of the upper portion of a refrigerator cabinet having a refrigerating system, with my invention embodied therein, mounted thereon.

Fig. 2 is a sectional view of a dehydrating cartridge used in carrying out my invention.

I have shown a refrigerator cabinet 1 having the motor 2, compressor 3 and condenser 4 of a refrigerating system mounted on the top thereof. Within the upper portion of cabinet 1 is secured a refrigerant expansion chamber 5 which is connected with the compressor 3 by the pipe 6 and which is also connected with the condenser 4 by the pipe 7, the expansion valve 8, the pipe 9, the container 10 and the pipe 11.

The container 10 is in the form of a hollow cylinder having a cover 12 for its upper end, and cover 13 for its lower end which is slightly conical in shape. In the central portion of cover 12 there is formed an opening 14 adapted to receive the end of pipe 11 leading from the condenser 4, and there is formed in the central portion of cover 13 an opening 15 adapted to receive the end of pipe 9. Within the container 10 and adjacent its ends, are positioned two screens 16 and 17 and between the screens 16 and 17 are positioned a mass of felt or other suitable filtering material 18, a mass of hygroscopic dehydrating material 19 and a second mass of felt or other suitable filtering material 20. The hygroscopic dehydrating material 19 may be either silica gel, charcoal, calcium carbide, calcium chloride, lime, or any similar material having like water adsorbing or absorbing qualities. I prefer to use silica gel as it has a very strong affinity for water but will not absorb the usual refrigerants under the existing conditions. The screen 16 serves to retain the filtering and dehydrating material in a given space, and to prevent swelling of filtering material 18 upon saturation with refrigerant which would cause it to move up closely against the cover 12 and opening 14 and so prevent a distribution of the incoming refrigerant over its surface. The screen 17 prevents the filtering material 20 from expanding into the cover 13 upon saturation and so retarding the flow of outgoing refrigerant.

In operation, the refrigerant flows from the condenser 4 through pipe 11 and opening 14 into container 10 where it passes through the filtering material 18 which retains particles of foreign material contained therein; it then passes through the dehydrating material 19 which absorbs the water contained therein, and then continues through filtering material 20 which retains any particles of foreign matter or dehydrating material, and then through the opening 15 and pipe 9, expansion valve 8 and pipe 7 to the expansion chamber. In the event of the dehydrating cartridge becoming filled with foreign matter or water, it may easily be removed from the system and a new cartridge or a new filling for the old one inserted.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. The process of filtering liquid refrigerant and abstracting water therefrom comprising filtering said refrigerant, passing it through a non-soluble dehydrator to remove water carried by it, and then refiltering it.

2. The method of purifying liquid refrigerant during operation in a refrigerating mechanism comprising passing said refrigerant through a non-soluble dehydrating material and filtering said refrigerant both before and after passing it through said material.

3. Means for purifying the refrigerant of mechanical refrigerating mechanisms comprising a container adapted to be inserted in the circulatory system of said mechanism and containing a non-soluble dehydrating material confined in the direction of flow of said refrigerant between separate masses of filtering material.

4. Means for purifying the liquid refrigerant of a mechanical refrigerating mechanism during operation thereof comprising a container adapted to be inserted in the circulatory system of said mechanism and containing a mass of filtering material adjacent the inlet and the outlet thereof, and a mass of non-soluble dehydrating material separating said masses of filtering material.

THOMAS J. LITLE, Jr.